United States Patent
Fraidlin et al.

(10) Patent No.: US 6,191,960 B1
(45) Date of Patent: Feb. 20, 2001

(54) ACTIVE CLAMP FOR ISOLATED POWER CONVERTER AND METHOD OF OPERATING THEREOF

(75) Inventors: Simon Fraidlin, Plano; Anatoliy Polikarpov, Mesquite, both of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/567,372

(22) Filed: May 9, 2000

(51) Int. Cl.[7] .............................. H02M 5/42; H02M 7/04
(52) U.S. Cl. .................. 363/25; 363/82; 363/90
(58) Field of Search .................. 363/25, 26, 81, 363/82, 84, 89, 90, 125, 127

(56) References Cited

U.S. PATENT DOCUMENTS

| | | | |
|---|---|---|---|
| 4,447,866 | * 5/1984 | Reeves | 363/82 |
| 4,811,187 | * 3/1989 | Nakajima et al. | 363/25 |
| 5,003,454 | * 3/1991 | Bruning | 363/81 |
| 5,006,975 | * 4/1991 | Neufeld | 363/80 |
| 5,075,839 | * 12/1991 | Fischer et al. | 363/48 |
| 5,289,361 | * 2/1994 | Vinciarelli | 363/80 |
| 5,489,837 | * 2/1996 | Arakawa | 363/89 |

\* cited by examiner

*Primary Examiner*—Peter S. Wong
*Assistant Examiner*—Bao Q. Vu (57) ABSTRACT

A secondary active clamp for a power converter, a method of actively clamping energy of the power converter and a power converter employing the clamp or the method. The power converter has a primary switching circuit coupled to a primary winding of an isolation transformer and a rectifier coupled to a secondary winding of the isolation transformer. In one embodiment, the clamp includes (1) an inductor coupled in series with a freewheeling diode of the rectifier and (2) a series-coupled capacitor and clamping switch coupled in parallel with the inductor. The series-coupled capacitor and clamping switch cooperate with the inductor to mitigate adverse effects of a reverse recovery phenomenon associated with the rectifier and to effect substantially zero voltage switching of a power switch of the primary switching circuit.

20 Claims, 7 Drawing Sheets

ACTIVE CLAMP FOR ISOLATED POWER CONVERTER AND METHOD OF OPERATING THEREOF

CROSS-REFERENCE TO RELATED APPLICATION

This application is related to U.S. patent application Ser. No. 09/383,322, entitled, Active Clamp for Power Converter and Method of Operation Thereof, to Simon Fraidlin, et al., filed on Aug. 26, 1999, commonly assigned with the present invention and incorporated herein by reference as if reproduced herein in its entirety.

TECHNICAL FIELD OF THE INVENTION

The present invention is directed, in general, to power conversion and, more specifically, to an active clamp for an isolated power converter, a method of operating the active clamp and a power converter employing the active clamp or the method.

BACKGROUND OF THE INVENTION

A power converter is a power processing circuit that converts an input voltage or current waveform into a specified output voltage or current waveform. A switched-mode power converter is a frequently employed power converter that converts an input voltage into a specified output voltage. A flyback converter is one example of an isolated switched-mode power converter that is typically employed in applications wherein a stable, regulated voltage is desired at the output of the power converter.

A flyback converter generally includes a switching circuit having at least one power switch, an isolation transformer, a rectifier having a freewheeling diode, and an output filter. A controller is included and employed to control the power switch. The conventional flyback converter operates as follows. The power switch is intermittently switched to apply the input voltage across a primary winding of the isolation transformer. The rectifier is coupled to a secondary winding of the isolation transformer and regulates the voltage received therefrom. The output filter smooths and filters the rectified voltage to provide a substantially constant output voltage at the output of the flyback converter. The controller monitors the output voltage and adjusts the duty cycle of the power switch to maintain the output voltage at a constant level despite variations in the input DC voltage and the load current. Depending on the duty cycle of the power switch, the output voltage may be regulated to any desired voltage between zero and the input voltage.

Analogous to other types of power converters (e.g., forward converter, half-bridge converter), the flyback converter is subject to inefficiencies that impair its overall performance. More specifically, the power switch, which may be a metal-oxide semiconductor field-effect transistor (MOSFET), has a finite switching speed and an intrinsic parasitic capacitance that affect its performance. A charge built up in the parasitic capacitance of the power switch may be dissipated during turn-on of the power switch, resulting in switching loss. Further, the freewheeling diode also has a finite switching speed and is, therefore, subject to a reverse recovery phenomenon that may induce a substantial current spike through both the power switch and the freewheeling diode. The losses associated with the power switch and the freewheeling diode increase linearly as the switching frequency of the converter is increased. Therefore, minimizing the reverse recovery phenomenon and the switching loss associated with the freewheeling diode and power switch will improve the overall efficiency of the flyback converter.

Accordingly, what is needed in the art is an active clamp, employable with a variety of power converter topologies, that reduces the losses associated with the reverse recovery phenomenon and further reduces the switching loss associated with the power switch of a power converter.

SUMMARY OF THE INVENTION

To address the above-discussed deficiencies of the prior art, the present invention provides, a secondary active clamp for a power converter, a method of actively clamping energy of the power converter and a power converter employing the clamp or the method. The power converter has a primary switching circuit coupled to a primary winding of an isolation transformer and a rectifier coupled to a secondary winding of the isolation transformer. In one embodiment, the clamp includes (1) an inductor coupled in series with a freewheeling diode of the rectifier and (2) a series-coupled capacitor and clamping switch coupled in parallel with the inductor. The series-coupled capacitor and clamping switch cooperate with the inductor to mitigate adverse effects of a reverse recovery phenomenon associated with the rectifier and to effect substantially zero voltage switching of a power switch of the primary switching circuit.

The present invention introduces, in one aspect, the concept of an active clamp employable on a secondary side of an isolation transformer. The active clamp is capable of reducing losses due to the reverse recovery phenomenon associated with the freewheeling diode of the rectifier and is further capable of reducing the switching losses associated with the power switch of the primary switching circuit.

In one embodiment of the present invention, the clamping switch conducts to couple the capacitor across the inductor, thereby enabling the capacitor to discharge through the inductor. The amount of energy stored in the capacitor is sufficient to effect substantially zero voltage switching of the power and clamping switches.

In an embodiment to be illustrated and described, the clamping switch is a metal oxide semiconductor field-effect transistor (MOSFET). Those skilled in the pertinent art will understand, however, that the present invention fully encompasses all controllable switches, whether conventional or later-developed. In a related embodiment, wherein the clamping switch includes a body diode, the freewheeling diode and a body diode of the clamping switch are similarly oriented. An external diode may be employed as required to supplement the body diode of the clamping switch. Of course, an external diode may be employed if the clamping switch does not include a body diode.

In one embodiment of the present invention, the converter is selected from the group consisting of a flyback converter, a forward converter and a half-bridge converter. Those skilled in the pertinent art understand, however, that other isolated converter topologies are well within the broad scope of the present invention.

In one embodiment of the present invention, the converter further includes a controller coupled to the power and clamping switches. The controller controls conduction intervals of the power and clamping switches. In an embodiment to be illustrated and described, the controller monitors the output voltage of the converter and controls the power and clamping switches in response thereto. Of course, the controller may monitor other points within the power converter and remain well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
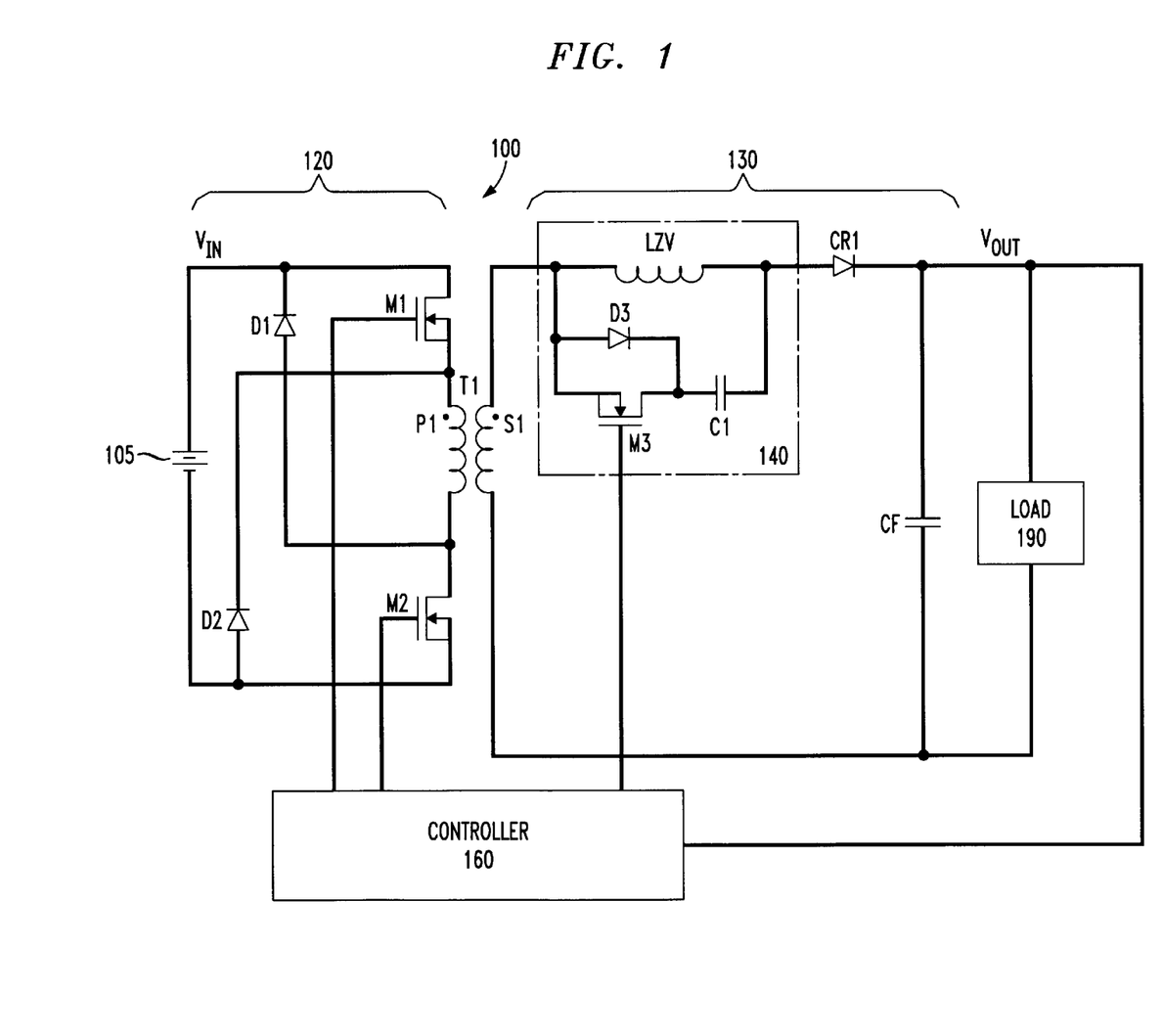
FIG. 1 illustrates a schematic diagram of an embodiment of a double-ended flyback converter constructed in accordance with the principles of the present invention.

Referring initially to FIG. 1, illustrated is a schematic diagram of an embodiment of a double-ended flyback converter 100 constructed in accordance with the principles of the present invention. The flyback converter 100 has an input couplable to a source of electrical power 105 having an input voltage $V_{IN}$. The flyback converter 100 provides an output voltage $V_{OUT}$ to a load 190 coupled to an output thereof.

The flyback converter 100 includes a primary switching circuit 120 coupled to a primary winding P1 of an isolation transformer T1. In the illustrated embodiment, the primary switching circuit 120 is a double-ended switching circuit having first and second power switches M1, M2 series coupled to opposing end taps of the primary winding P1. The primary switching circuit 120 further includes a first diode D1 coupled across the first power switch M1 and the primary winding P1. The primary switching circuit 120 still further includes a second diode D2 coupled across the primary winding P1 and the second power switch M2. Of course, other topologies may be employed for the primary switching circuit 120 and still remain well within the broad scope of the present invention.

In the illustrated embodiment, the first and second power switches M1, M2 are metal oxide semiconductor field-effect transistors (MOSFETs). Of course, other types of power switches, including bipolar junction transistors (BJTs), are well within the broad scope of the present invention.

The flyback converter 100 further includes a secondary circuit 130 coupled across a secondary winding S1 of the isolation transformer T1. The secondary circuit 130 includes a rectifier, having a freewheeling diode CR1, coupled to the secondary winding S1. The secondary circuit 130 further includes a secondary active clamp 140 coupled between the secondary winding S1 and the freewheeling diode CR1. The secondary circuit 130 still further includes a filter capacitor CF coupled across the output.

In the illustrated embodiment, the secondary active clamp 140 includes an inductor (clamping inductor LZV) coupled in series with the freewheeling diode CR1. The secondary active clamp 140 further includes a series-coupled capacitor (clamping capacitor C1) and clamping switch M3 coupled in parallel with the clamping inductor LZV. In the illustrated embodiment, the clamping switch M3 is a MOSFET having a body diode D3. Of course, the use of any conventional or later-developed controllable switch is well within the broad scope of the present invention. The clamping switch M3 is preferably positioned such that the body diode D3 is similarly oriented with respect to the freewheeling diode CR1. While the body diode D3 is integral to the clamping switch M3 and is explicitly illustrated to show its orientation, an external diode may be employed as required to supplement the body diode D3. Alternatively, an external diode may be required if the clamping switch does not have an integral body diode.

The flyback converter 100 still further includes a controller 160 coupled to the first and second power switches M1, M2 and the clamping switch M3. The controller 160 monitors the output voltage $V_{OUT}$ and controls conduction intervals of the first and second power switches M1, M2 and the clamping switch M3 to regulate the output voltage $V_{OUT}$ despite fluctuations in the input voltage $V_{IN}$ or the load 190. Of course, the controller 160 may monitor other control points within the flyback converter 100 as desired.

The flyback converter 100 operates as follows. The first and second power switches M1, M2 are both ON (conducting) for a primary interval D to transfer energy from the source 105 to a magnetizing inductance of the isolation transformer T1. A primary magnetizing current (through the primary winding P1) ramps up substantially linearly during the primary interval D. There is negligible current flow in the secondary circuit 130 because the freewheeling diode CR1 is reverse biased. A charge stored in the filter capacitor CF provides power to the load 190 during the primary interval D.

The first and second power switches M1, M2 are then OFF (non-conducting) for a complementary interval 1-D. Turning OFF the first and second power switches M1, M2 interrupts the flow of the magnetizing current in the primary winding P1. The polarity of the primary and secondary windings P1, S1 reverses as the magnetizing current now flows in the secondary winding S1. During the complementary interval 1-D, the secondary current ramps down as it provides power to the load 190 and replenishes the charge in the filter capacitor CF.

Initially, the secondary current flows through the body diode D3 of the clamping switch M3, the clamping capacitor C1 and the freewheeling diode CR1. The clamping capacitor C1 begins to charge and a clamping voltage is developed thereacross. Since the clamping capacitor C1 and the clamping switch M3 are coupled across the clamping inductor LZV, the clamping voltage is applied across the clamping inductor LZV, causing a portion of the secondary current to begin to flow through the clamping inductor LZV. As the clamping capacitor C1 continues to charge, the portion of the secondary current through the body diode D3 and clamping capacitor C1 decreases while the portion of the secondary current through the clamping inductor LZV increases. Once the portion of the secondary current through the clamping capacitor C1 has decreased to zero, essentially all the secondary current will flow through the clamping inductor LZV. The clamping capacitor C1 is now charged to a finite level.

Prior to the start of the next primary interval D, the clamping switch M3 is turned ON for a short time, effectively placing the clamping capacitor C1 across the clamping inductor LZV. The clamping capacitor C1 can now discharge through the clamping switch M3 and the clamping inductor LZV. The current through the clamping inductor LZV is now greater than it was prior to the turn ON of the clamping switch M3. After a short time, the clamping switch M3 is turned OFF, causing a current step in the current through the freewheeling diode CR1 above the level of the secondary current. The current step is transformed to the primary switching circuit 120 where it is employed to discharge the parasitic capacitances of the first and second power switches M1, M2 to the point that the body diodes of the first and second power switches M1, M2 begin to conduct. At this time, the first and second power switches M1, M2 can be turned ON with substantially zero volts thereacross, thus achieving zero voltage switching (ZVS).

Conventionally, turning ON the first and second power switches M1, M2 would place the source 105 across the primary winding P1, which would cause the freewheeling diode CR1 to exhibit a reverse recovery phenomenon for a short time as current flows in a reverse direction through the freewheeling diode CR1. The reverse current flow would generate spurious and uncontrollable reflected current spikes in the primary current flowing through the first and second power switches M1, M2. The secondary active clamp 140 of the present invention, however, advantageously positions the clamping inductor LZV in series with the freewheeling diode CR1 such that a reverse current flows through the clamping inductor LZV as a result of the reverse recovery phenomenon exhibited by the freewheeling diode CR1. Once the freewheeling diode CR1 turns OFF, the energy stored in the clamping inductor LZV may be transferred to the clamping capacitor C1 through the body diode D3 of the clamping switch M3 to further charge the clamping capacitor C1. Energy losses and noise problems associated with the reverse recovery phenomenon may thus be reduced.

Figure 2:
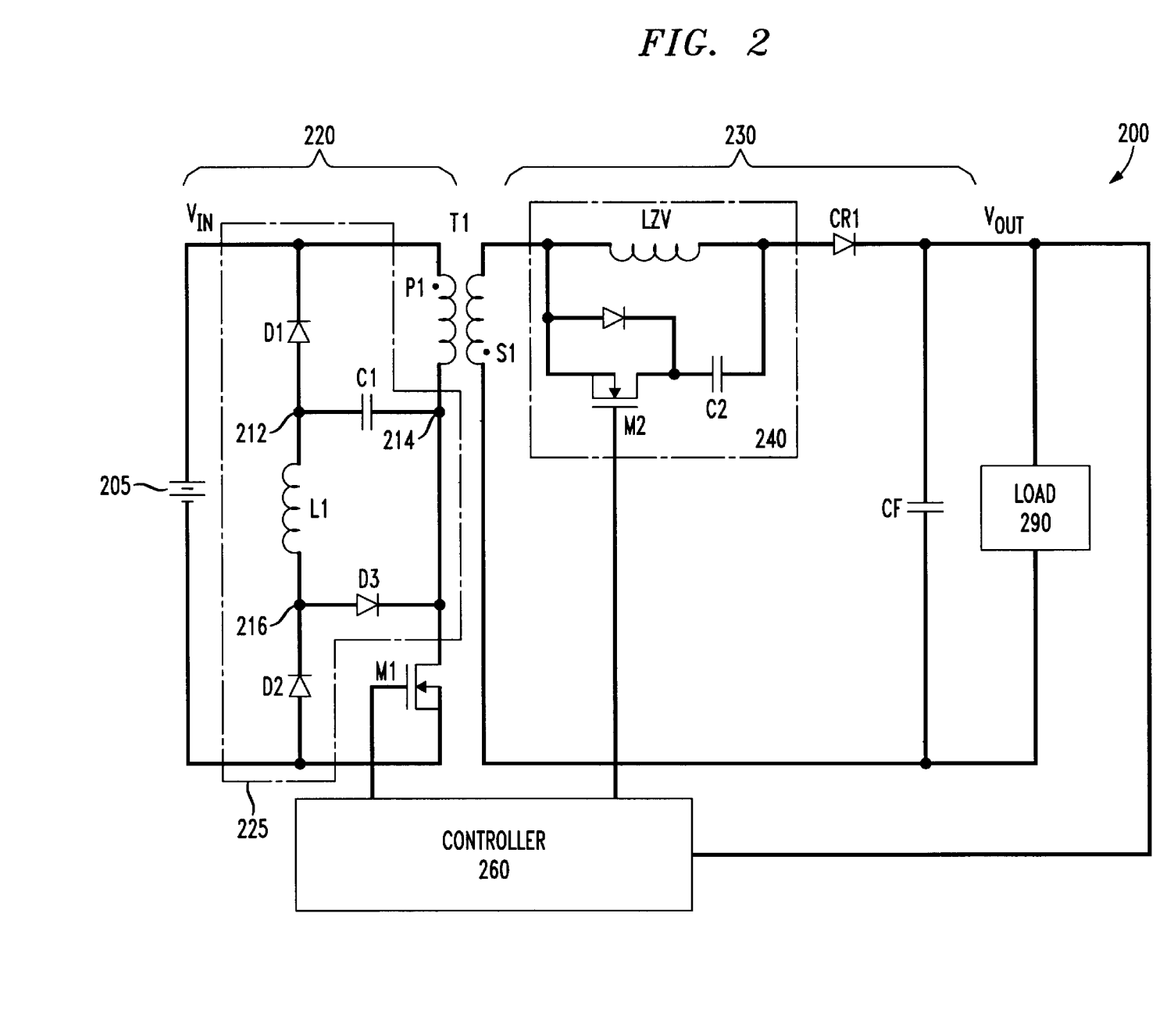
FIG. 2 illustrates a schematic diagram of an embodiment of a single-ended flyback converter constructed in accordance with the principles of the present invention.

Turning now to FIG. 2, illustrated is a schematic diagram of an embodiment of a single-ended flyback converter 200 constructed in accordance with the principles of the present invention. The flyback converter 200 has an input couplable to a source of electrical power 205 having an input voltage $V_{IN}$. The flyback converter 200 provides an output voltage $V_{OUT}$ to a load 290 coupled to an output thereof.

The flyback converter 200 includes a primary switching circuit 220 coupled to a primary winding P1 of an isolation transformer T1. In the illustrated embodiment, the primary switching circuit 220 is a single-ended switching circuit having a power switch M1 coupled to the primary winding P1. The primary switching circuit 220 further includes a passive clamp 225 coupled to the power switch M1. The passive clamp 225 includes a series-coupled first diode D1, inductor L1 and second diode D2, coupled across the input. The passive clamp 225 further includes a first capacitor C1 coupled between a first node 212 (between the first diode D1 and the inductor L1) and a second node 214 (between the primary winding P1 and the power switch M1). The passive clamp 225 still further includes a third diode D3 coupled between a third node 216 (between the inductor L1 and the second diode D2) and the second node 214. While the illustrated embodiment of the primary switching circuit 220 is a single-ended switching circuit employing the passive clamp 225, other switching topologies, including those employing an active clamp, are well within the broad scope of the present invention.

The flyback converter 200 further includes a secondary circuit 230 coupled across a secondary winding S1 of the isolation transformer T1. The secondary circuit 230 includes a rectifier, having a freewheeling diode CR1, coupled to the secondary winding S1. The secondary circuit 230 further includes a secondary active clamp 240 coupled between the secondary winding S1 and the freewheeling diode CR1. The secondary circuit 230 still further includes a filter capacitor CF coupled across the output. The secondary circuit 230 and the secondary active clamp 240 are similar to the secondary circuit 130 and secondary active clamp 140 illustrated and described with respect to FIG. 1 and, as a result, will not be described in detail.

The flyback converter 200 still further includes a controller 260 coupled to the power switch M1 and a clamping switch M2 of the secondary active clamp 240. The controller 260 monitors the output voltage $V_{OUT}$ and controls conduction intervals of the power switch M1 and the clamping switch M2 to regulate the output voltage $V_{OUT}$ despite fluctuations in the input voltage $V_{IN}$ or the load 290.

The flyback converter 200 operates as follows. The power switch M1 is ON (conducting) for a primary interval D to transfer energy from the source 205 to a magnetizing inductance of the isolation transformer T1. A primary magnetizing current (through the primary winding P1) ramps up substantially linearly during the primary interval D. The power switch M1 is then OFF (nonconducting) for a complementary interval 1-D. The magnetizing current in the primary winding P1 recovers through the second diode D2, the inductor L1 and the first diode D1. After the recovery period, the current changes direction and circulates through the third diode D3 to charge the capacitor C1. The third diode D3 allows the energy stored in the inductor L1 during the recovery of the first and second diodes D1, D2 to be removed. The energy may be temporarily stored in the capacitor C1 and subsequently transferred to the source 205.

The operation of the secondary circuit 230 and the secondary active clamp 240 is analogous to that illustrated and described with respect to FIG. 1 and, as a result, will not hereinafter be repeated.

Figure 3:
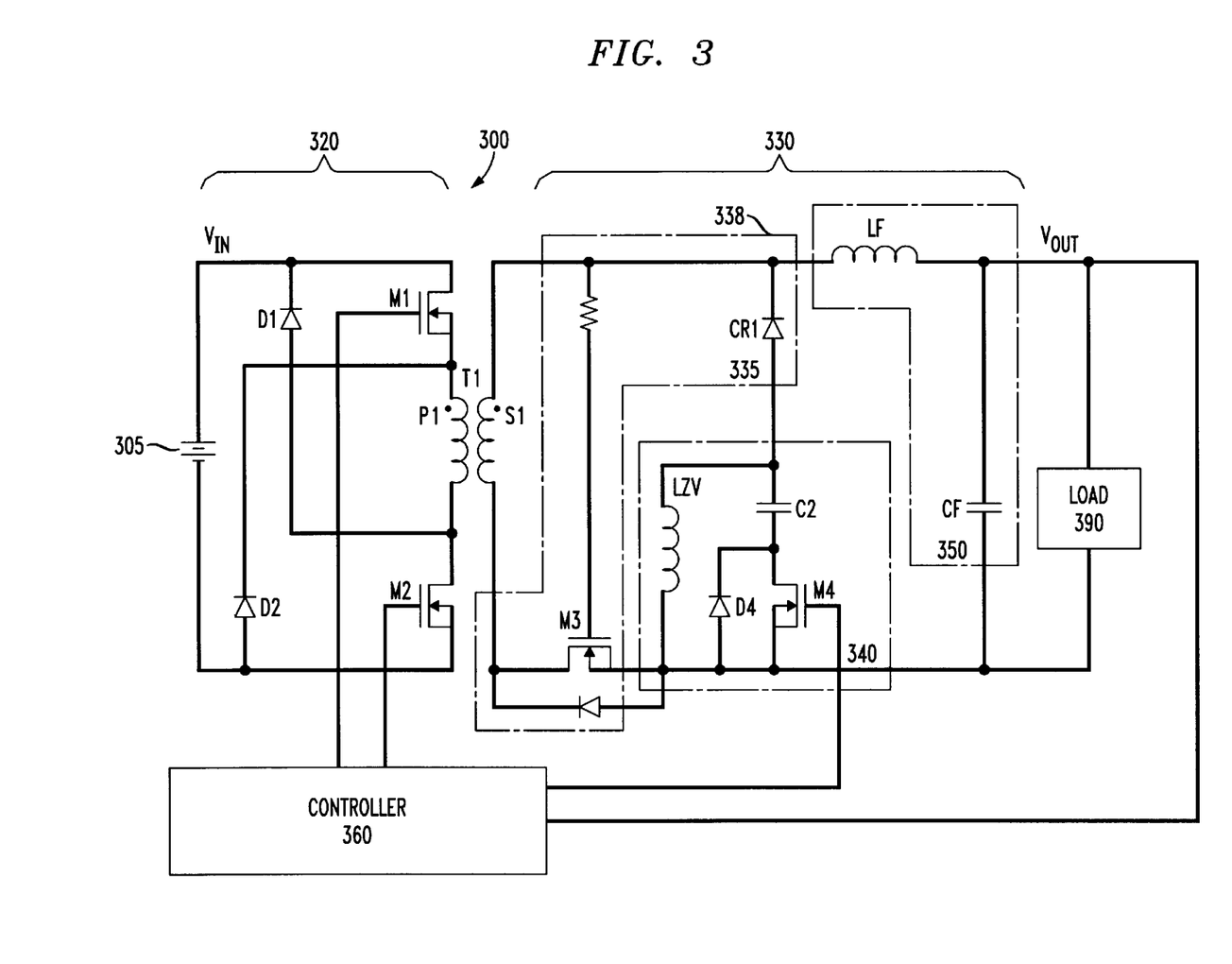
FIG. 3 illustrates a schematic diagram of an embodiment of a double-ended forward converter constructed in accordance with the principles of the present invention.

Turning now to FIG. 3, illustrated is a schematic diagram of an embodiment of a double-ended forward converter 300 constructed in accordance with the principles of the present invention. The forward converter 300 has an input couplable to a source of electrical power 305 having an input voltage $V_{IN}$. The forward converter 300 provides an output voltage $V_{OUT}$ to a load 390 coupled to an output thereof.

The forward converter 300 includes a primary switching circuit 320 coupled to a primary winding P1 of an isolation transformer T1. In the illustrated embodiment, the primary switching circuit 320 is a double-ended switching circuit having first and second power switches M1, M2 series coupled to opposing end taps of the primary winding P1. The primary switching circuit 320 further includes a first diode D1 coupled across the first power switch M1 and the primary winding P1. The primary switching circuit 320 still further includes a second diode D2 coupled across the primary winding P1 and the second power switch M2. Of course, other topologies may be employed for the primary switching circuit 320 and still remain well within the broad scope of the present invention.

The forward converter 300 further includes a secondary circuit 330 coupled across a secondary winding S1 of the isolation transformer T1. The secondary circuit 330 includes a rectifier 335, having a self-driven rectifying switch M3 and a freewheeling diode CR1, coupled to the secondary winding S1. While the rectifier 335 is illustrated as having a self-driven rectifying switch M3, the use of a control-driven rectifying switch is well within the broad scope of the present invention. The secondary circuit 330 further includes a secondary active clamp 340 series coupled to the freewheeling diode CR1. The secondary circuit 330 still further includes an output filter 350, having a filter inductor LF and a filter capacitor CF, coupled to the output.

In the illustrated embodiment, the secondary active clamp 340 includes an inductor (clamping inductor LZV) coupled in series with the freewheeling diode CR1. The secondary active clamp 340 further includes a series-coupled capacitor (clamping capacitor C2) and clamping switch M4 coupled in parallel with the clamping inductor LZV. In the illustrated embodiment, the clamping switch M4 is a MOSFET having a body diode D4. Of course, the use of any conventional or later-developed controllable switch is well within the broad scope of the present invention. The clamping switch M4 is preferably positioned such that the body diode D4 is similarly oriented with respect to the freewheeling diode CR1.

The forward converter 300 still further includes a controller 360 coupled to the first and second power switches M1, M2 and the clamping switch M4. The controller 360 monitors the output voltage $V_{OUT}$ and controls conduction intervals of the first and second power switches M1, M2 and the clamping switch M4 to regulate the output voltage $V_{OUT}$ despite fluctuations in the input voltage $V_{IN}$ or the load 390. Of course, the controller 360 may monitor other control points within the forward converter 300 as desired.

The forward converter 300 operates as follows. The first and second power switches M1, M2 are both ON (conducting) for a primary interval D to transfer energy from the source 305, via the isolation transformer T1, to the filter inductor LF, the filter capacitor CF and the load 390. During the primary interval D, there is negligible current flow in the freewheeling diode CR1 since it is reverse biased. Current in the secondary circuit 330 flows through the secondary winding S1, the filter inductor LF, both the filter capacitor CF and the load 390, and the rectifying switch M3.

The first and second power switches M1, M2 are then OFF (nonconducting) for a complementary interval 1-D. Turning OFF the first and second power switches M1, M2 interrupts the flow of current in the primary winding P1. The polarity of the primary and secondary windings P1, S1 reverses, turning OFF the rectifying switch M3. Energy stored in the filter inductor LF now circulates (as a secondary current) through the freewheeling diode CR1, the filter inductor LF, both the filter capacitor CF and the load 390, and the secondary active clamp 340.

Initially, the secondary current flows through the body diode D4 of the clamping switch M4 and the clamping capacitor C2. The clamping capacitor C2 begins to charge and a clamping voltage is developed thereacross. Since the clamping capacitor C2 and the clamping switch M4 are coupled across the clamping inductor LZV, the clamping voltage is applied across the clamping inductor LZV, causing a portion of the secondary current to begin to flow through the clamping inductor LZV. As the clamping capacitor C2 continues to charge, the portion of the secondary current through the body diode D4 and clamping capacitor C2 decreases while the portion of the secondary current through the clamping inductor LZV increases. Once the portion of the secondary current through the clamping capacitor C2 has decreased to zero, essentially all the secondary current will flow through the clamping inductor LZV. The clamping capacitor C2 is now charged to a finite level.

Prior to the start of the next primary interval D, the clamping switch M4 is turned ON for a short time, effectively placing the clamping capacitor C2 across the clamping inductor LZV. The clamping capacitor C2 can now discharge through the clamping switch M4 and the clamping inductor LZV. The current through the clamping inductor LZV is now greater than it was prior to the turn ON of the clamping switch M4. After a short time, the clamping switch M4 is turned OFF, causing a current step in the current through the freewheeling diode CR1 above the level of the secondary current.

The current step in the clamping inductor LZV causes a rise in potential at a node 338 coupling the freewheeling diode CR1, the secondary winding S1 and a control terminal of the rectifying switch M3. The rise in potential turns ON the switch M3, allowing the current step generated by the turning OFF of the clamping switch M4 to flow to the secondary winding S1. The current step is then transformed to the primary winding P1 where it is employed to discharge the parasitic capacitances of the first and second power switches M1, M2 to the point that the body diodes of the first and second power switches M1, M2 begin to conduct. At this time, the first and second power switches M1, M2 can be turned ON with substantially zero volts thereacross, thus achieving zero voltage switching.

Conventionally, turning ON the first and second power switches M1, M2 would place the source 305 across the primary winding P1, which would cause the freewheeling diode CR1 to exhibit a reverse recovery phenomenon for a short time as current flows in a reverse direction through the freewheeling diode CR1. The reverse current flow would generate spurious and uncontrollable reflected current spikes in the primary current flowing through the first and second power switches M1, M2. The secondary active clamp 340 of the present invention, however, advantageously positions the clamping inductor LZV in series with the freewheeling diode CR1 such that a reverse current flows through the clamping inductor LZV as a result of the reverse recovery phenomenon exhibited by the freewheeling diode CR1. Once the freewheeling diode CR1 turns OFF, the energy stored in the clamping inductor LZV may be transferred to the clamping capacitor C2 through the body diode D4 of the clamping switch M4 to further charge the clamping capacitor C2. Energy losses and noise problems associated with the reverse recovery phenomenon may thus be reduced.

Figure 4:
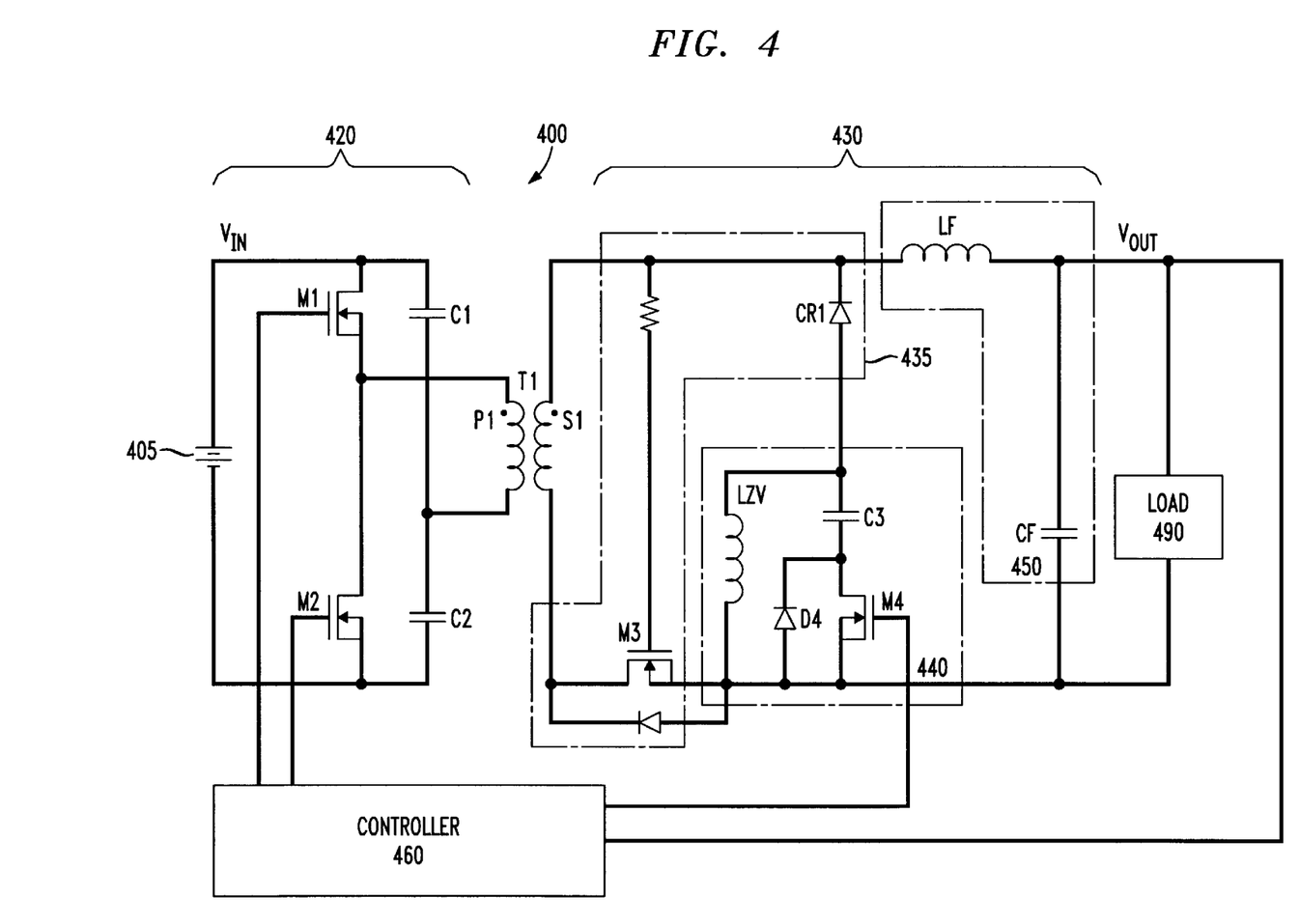
FIG. 4 illustrates a schematic diagram of an embodiment of a half-bridge converter constructed in accordance with the principles of the present invention.

Turning now to FIG. 4, illustrated is a schematic diagram of an embodiment of a half-bridge converter 400 constructed in accordance with the principles of the present invention. The half-bridge converter 400 has an input couplable to a source of electrical power 405 having an input voltage $V_{IN}$. The half-bridge converter 400 provides an output voltage $V_{OUT}$ to a load 490 coupled to an output thereof.

The half-bridge converter 400 includes a primary switching circuit 420 coupled to a primary winding P1 of an isolation transformer T1. In the illustrated embodiment, the primary switching circuit 420 includes first and second power switches M1, M2 and first and second capacitors C1, C2 arranged in a half-bridge topology. The operation of the half-bridge primary switching circuit 420 will be familiar to those skilled in the pertinent art and, as a result, will not be described.

The half-bridge converter 400 further includes a secondary circuit 430 coupled across a secondary winding S1 of the isolation transformer T1. The secondary circuit 430 includes a rectifier 435, having a self-driven rectifying switch M3 and a freewheeling diode CR1, coupled to the secondary winding S1. The secondary circuit 430 further includes a secondary active clamp 440 series coupled to the freewheeling diode CR1. The secondary circuit 430 still further includes an output filter 450, having a filter inductor LF and a filter capacitor CF, coupled to the output.

The secondary circuit 4 30 and the secondary active clamp 440 are similar to the secondary circuit 330 and secondary active clamp 340 illustrated and described with respect to FIG. 3 and, as a result, will not hereinafter be described in detail.

The half-bridge converter 400 still further includes a controller 460 coupled to the first and second power switches M1, M2 and a clamping switch M4 of the secondary active clamp 440. The controller 460 monitors the output voltage $V_{OUT}$ and controls conduction intervals of the first and second power switches M1, M2 and the clamping switch M4 to regulate the output voltage $V_{OUT}$ despite fluctuations in the input voltage $V_{IN}$ or the load 490.

The operation of the secondary circuit 430 and the secondary active clamp 440 is analogous to that illustrated and described with respect to FIG. 3 and, as a result, will not hereinafter be repeated.

Figure 5:
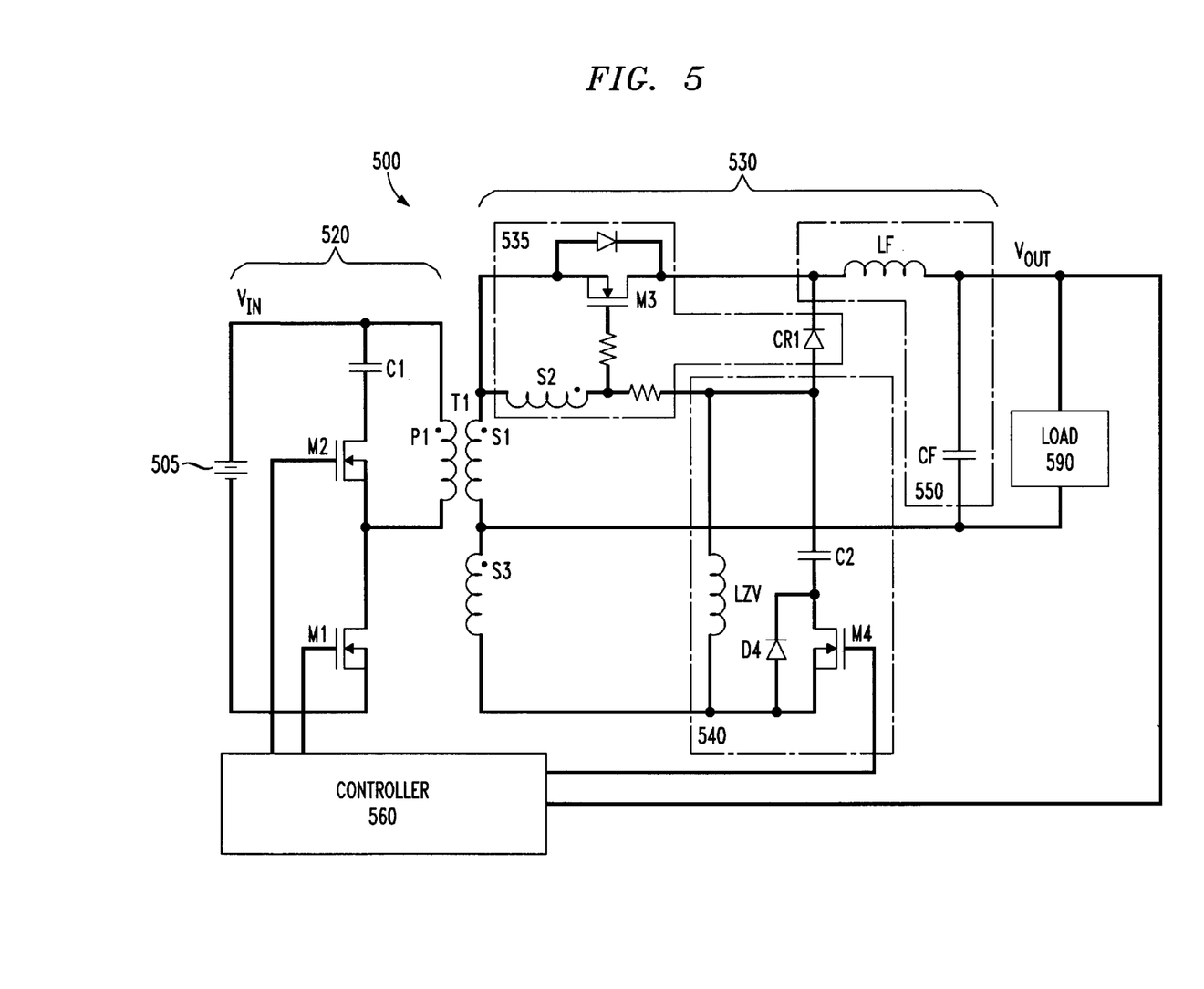
FIG. 5 illustrates a schematic diagram of another embodiment of a forward converter constructed in accordance with the principles of the present invention.

Turning now to FIG. 5, illustrated is a schematic diagram of an embodiment of a forward converter 500 constructed in accordance with the principles of the present invention. The forward converter 500 has an input couplable to a source of electrical power 505 having an input voltage $V_{IN}$. The forward converter 500 provides an output voltage $V_{OUT}$ to a load 590 coupled to an output thereof.

The forward converter 500 includes a primary switching circuit 520 coupled to a primary winding P1 of an isolation transformer T1. The primary switching circuit 520 has a first switch M1 coupled in series with the primary winding P1. The primary switching circuit 520 further includes an active clamp, including a capacitor C1 and a second switch M2, coupled across the primary winding P1. Of course, other switching topologies are well within the broad scope of the present invention. The operation of the primary switching circuit 520 will be familiar to those skilled in the pertinent art and, as a result, will not be described.

The forward converter 500 further includes a secondary circuit 530 coupled to a secondary winding S1 of the isolation transformer T1. The secondary circuit 530 includes a rectifier 535 coupled to the secondary winding S1. In the illustrated embodiment, the rectifier 535 includes a self-driven rectifying switch M3 and a freewheeling diode CR1. The rectifier 535 further includes a drive winding S2 that provides drive signals to the rectifying switch M3. The drive winding S2 scales the drive signals from the primary winding S1 to an appropriate level to drive the rectifying switch M3. Of course, other methods of controlling the rectifying switch M3 are well within the broad scope of the present invention.

The secondary circuit 530 further includes a secondary active clamp 540 having an inductor LZV coupled in series with the freewheeling diode CR1, and a series-coupled capacitor C2 and clamping switch M4 coupled in parallel with the inductor LZV. The secondary circuit 530 still further includes an output filter 550, having a filter inductor LF and a filter capacitor CF, coupled to the output.

The forward converter 500 still further includes a controller 560 coupled to the first and second switches M1, M2 and the clamping switch M4. The controller 560 monitors the output voltage $V_{OUT}$ and controls conduction intervals of the first and second power switches M1, M2 and the clamping switch M4 to regulate the output voltage $V_{OUT}$ despite fluctuations in the input voltage $V_{IN}$ or the load 590.

The operation of the secondary circuit 530 and the secondary active clamp 540 is analogous to that illustrated and described with respect to FIG. 3 and, as a result, will not hereinafter be repeated.

The active clamp of the primary switching circuit 520 may be inherently capable of providing zero voltage switching. However, to realize zero voltage switching, a specified amount of magnetizing inductance is generally required. The amount of magnetizing inductance that is appropriate for zero voltage switching is generally different from the amount that is appropriate for static circuit efficiency. The use of the secondary active clamp 540 relieves the active clamp of the primary switching circuit 520 from zero voltage switching concerns. The magnetizing inductance may thus be selected to optimize circuit efficiency without regard for zero voltage switching concerns.

Figure 6:
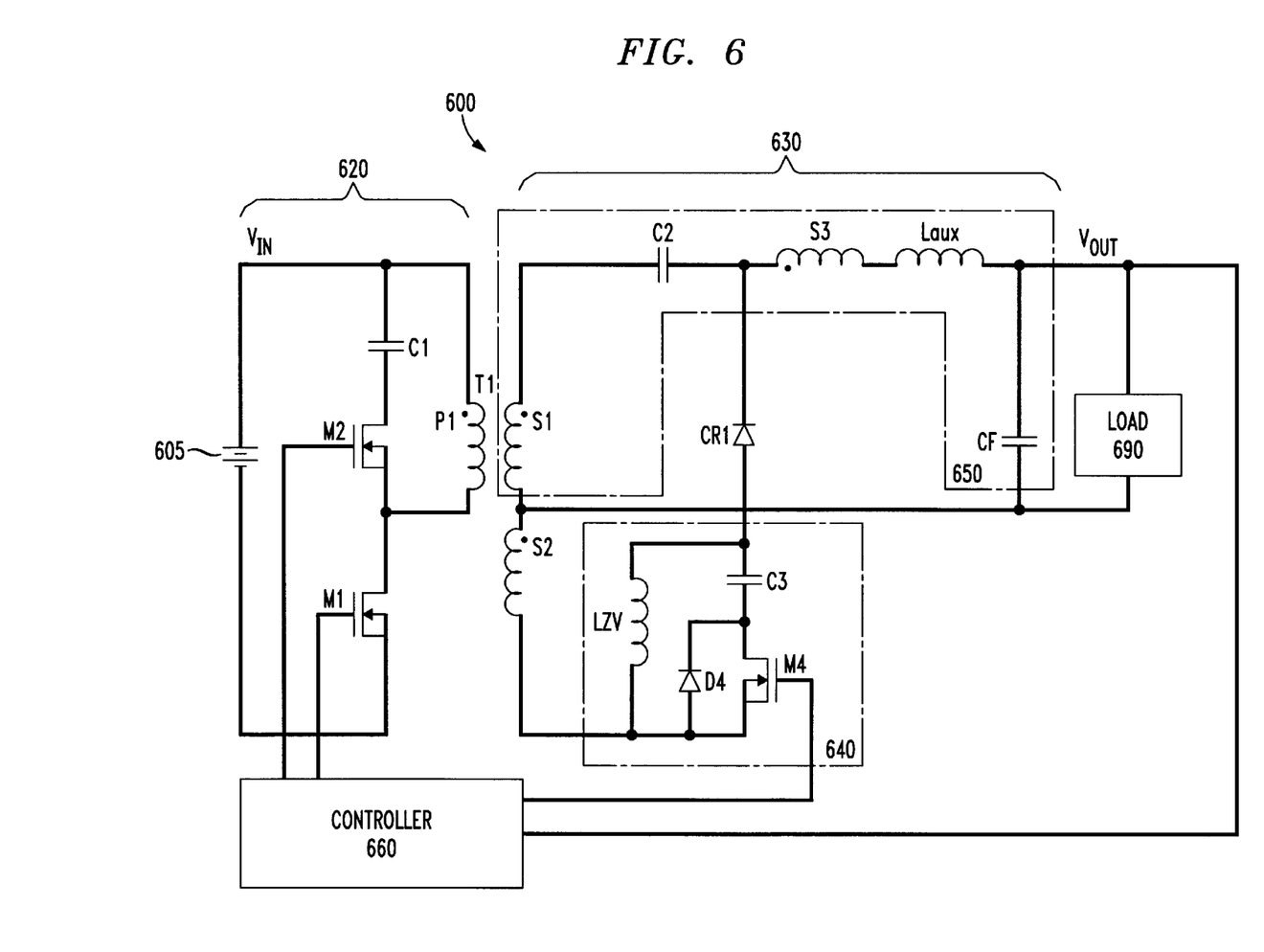
FIG. 6 illustrates a schematic diagram of another embodiment of a forward converter constructed in accordance with the principles of the present invention.

Turning now to FIG. 6, illustrated is a schematic diagram of another embodiment of a forward converter 600 constructed in accordance with the principles of the present invention. The forward converter 600 has an input couplable to a source of electrical power 605 having an input voltage $V_{IN}$. The forward converter 600 provides an output voltage $V_{OUT}$ to a load 690 coupled to an output thereof.

The forward converter 600 includes a primary switching circuit 620 coupled to a primary winding P1 of an isolation transformer T1. The primary switching circuit 620 is similar to the primary switching circuit 520 illustrated and described with respect to FIG. 5 and, as a result, will not hereinafter be further described.

The forward converter 600 further includes a secondary circuit 630 coupled to a secondary winding S1 of the isolation transformer T1. The secondary circuit 630 includes a rectifier (a freewheeling diode CR1) coupled to the secondary winding S1. Of course, other rectifier topologies are well within the broad scope of the present invention.

The secondary circuit 630 further includes a secondary active clamp 640 having an inductor LZV coupled in series with the freewheeling diode CR1, and a series-coupled capacitor C3 and clamping switch M4 coupled in parallel with the inductor LZV. The secondary circuit 630 still further includes a magnetically-coupled output filter 650, including secondary windings S1, S3 of the isolation transformer T1, an auxiliary inductor Laux, a capacitor C2 and a filter capacitor CF, coupled to the output. The secondary windings S1, S3 are magnetically-coupled inductances embodied in an integrated package with the isolation transformer T1. The auxiliary inductor Laux represents a leakage inductance of the secondary windings S1, S3. Alternatively, the auxiliary inductor Laux may be an additional inductor employed to supplement the magnetically-coupled inductances. The use of the magnetically-coupled inductances advantageously reduces the size of the output filter 650.

The forward converter 600 still further includes a controller 660 coupled to first and second switches M1, M2 of the primary switching circuit 620 and the clamping switch M4. The controller 660 monitors the output voltage $V_{OUT}$ and controls conduction intervals of the first and second switches M1, M2 and the clamping switch M4 to regulate the output voltage $V_{OUT}$ despite fluctuations in the input voltage $V_{IN}$ or the load 690.

The operation of the secondary circuit 630 and the secondary active clamp 640 is analogous to that illustrated and described with respect to FIG. 3 and, as a result, will not hereinafter be repeated.

Figure 7:
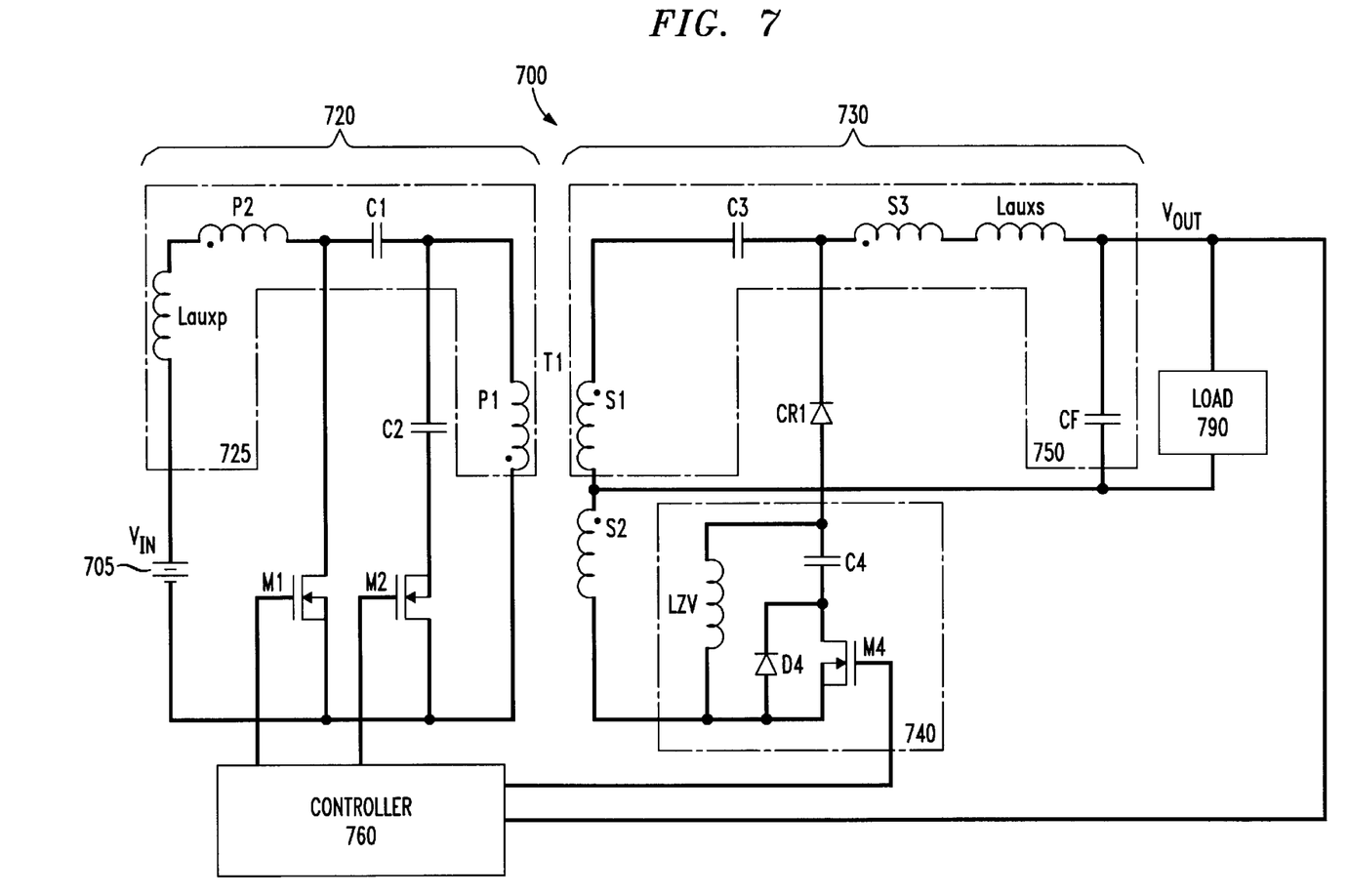
FIG. 7 illustrates a schematic diagram of an embodiment of a magnetically coupled converter constructed in accordance with the principles of the present invention.

Turning now to FIG. 7, illustrated is a schematic diagram of an embodiment of a power converter 700 constructed in accordance with the principles of the present invention. The power converter 700 has an input couplable to a source of electrical power 705 having an input voltage $V_{IN}$. The power converter 700 provides an output voltage $V_{OUT}$ to a load 790 coupled to an output thereof.

The power converter 700 includes a primary switching circuit 720 coupled to a primary winding P1 of an isolation transformer T1. The primary switching circuit 720 includes a magnetically-coupled input filter 725, including primary windings P1, P2 of the isolation transformer T1, a primary side auxiliary inductor Lauxp and a first capacitor C1. The primary side auxiliary inductor Lauxp represents a leakage inductance of the primary windings P1, P2 or, alternatively, may be an additional inductor employed to supplement the inductances of the primary windings P1, P2.

The primary switching circuit 720 further includes a first switch M1 coupled to the magnetically-coupled input filter 725. The primary switching circuit 720 further includes an active clamp, having a second capacitor C2 and a second switch M2, coupled across the primary winding P1. Of course, other switching topologies are well within the broad scope of the present invention.

The power converter 700 further includes a secondary circuit 730 coupled to a secondary winding S1 of the isolation transformer T1. The secondary circuit 730 includes a rectifier (a freewheeling diode CR1) coupled to the secondary winding S1. Of course, other rectifier topologies are well within the broad scope of the present invention.

The secondary circuit 730 further includes a secondary active clamp 740 having an inductor LZV coupled in series with the freewheeling diode CR1, and a series-coupled capacitor C4 and clamping switch M4 coupled in parallel with the inductor LZV. The secondary circuit 730 still further includes a magnetically-coupled output filter 750, including secondary windings S1, S3 of the isolation transformer T1, a secondary side auxiliary inductor Lauxs, a third capacitor C3 and a filter capacitor CF, coupled to the output. The secondary side auxiliary inductor Lauxs represents a leakage inductance of the secondary windings S1, S3, or may be an additional inductor employed to supplement the inductance of the secondary windings S1, S3.

The primary windings P1, P2 and the secondary windings S1, S3 are magnetically-coupled inductances embodied in an integrated package with the isolation transformer T1 and may advantageously employ a single core. The use of the magnetically-coupled inductances reduces the size of the input and output filters 725, 750 and may allow the power converter 700 to employ only one magnetic component.

The power converter 700 still further includes a controller 760 coupled to the first and second switches M1, M2 and the clamping switch M4. The controller 760 monitors the output voltage $V_{OUT}$ and controls conduction intervals of the first and second switches M1, M2 and the clamping switch M4 to regulate the output voltage $V_{OUT}$ despite fluctuations in the input voltage $V_{IN}$ or the load 790.

The operation of the secondary circuit 730 and the secondary active clamp 740 is analogous to that illustrated and described with respect to FIG. 3 and, as a result, will not hereinafter be repeated.

Those skilled in the art should understand that the previously described embodiments of the secondary active clamp, method of operation thereof and power converter are submitted for illustrative purposes only and other embodiments of the secondary active clamp capable of mitigating the adverse effects of the reverse recovery phenomenon associated with the rectifier and effecting substantially zero voltage switching of the power switch of the primary switching circuit are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

For a better understanding of power converters, see *Modern DC-to-DC Switchmode Power Converter Circuits*, by Rudolph P. Severns and Gordon Bloom, Van Nostrand Reinhold Company, New York, N.Y. (1985); and *Principles of Power Electronics*, by John G. Kassakian, Martin F. Schlect and George C. Verghese, Addison-Wesley Publishing Company, Reading, Mass. (1991). The above-listed references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a power converter having a primary switching circuit coupled to a primary winding of an isolation transformer and a rectifier coupled to a secondary winding of said isolation transformer, a secondary active clamp, comprising:

an inductor, coupled in series with a freewheeling diode of said rectifier, and a series-coupled capacitor and clamping switch, coupled in parallel with said inductor, configured to cooperate therewith to mitigate adverse effects of a reverse recovery phenomenon associated with said rectifier and to effect substantially zero voltage switching of a power switch of said primary switching circuit.

2. The clamp as recited in claim 1 wherein said clamping switch is configured to couple said capacitor across said inductor thereby enabling said capacitor to discharge through said inductor.

3. The clamp as recited in claim 1 wherein said clamping switch is a metal oxide semiconductor field-effect transistor (MOSFET).

4. The clamp as recited in claim 3 wherein said freewheeling diode and a body diode of said clamping switch are similarly oriented.

5. The clamp as recited in claim 1 wherein said power converter is selected from the group consisting of:

a flyback converter;

a forward converter; and a half-bridge converter.

6. The clamp as recited in claim 1 wherein said power converter further comprises a controller, coupled to said power and clamping switches, configured to control conduction intervals of said power and clamping switches.

7. The clamp as recited in claim 6 wherein said controller is configured to monitor an output voltage of said power converter and to control said power and clamping switches in response thereto.

8. For use with a power converter having a primary switching circuit coupled to a primary winding of an isolation transformer and a rectifier coupled to a secondary winding of said isolation transformer, a method of actively clamping energy of said power converter, comprising:

mitigating adverse effects of a reverse recovery phenomenon associated with said rectifier with a secondary active clamp having a series-coupled capacitor and clamping switch coupled in parallel with an inductor, said clamp coupled in series with a freewheeling diode of said rectifier; and effecting, with said clamp, substantially zero voltage switching of a power switch of said primary switching circuit.

9. The method as recited in claim 8 further comprising discharging said capacitor through said inductor.

10. The method as recited in claim 8 wherein said clamping switch is a metal oxide semiconductor field-effect transistor (MOSFET).

11. The method as recited in claim 10 wherein said freewheeling diode and a body diode of said clamping switch are similarly oriented.

12. The method as recited in claim 8 wherein said power converter is selected from the group consisting of:

a flyback converter;

a forward converter; and a half-bridge converter.

13. The method as recited in claim 8 further comprising controlling conduction intervals of said power and clamping switches.

14. The method as recited in claim 13 wherein said controlling comprises monitoring an output voltage of said power converter and controlling said power and clamping switches in response thereto.

15. A power converter, couplable to a source of electrical energy, comprising:

a primary switching circuit coupled to a primary winding of an isolation transformer and having a power switch that conducts intermittently to transfer energy from said source to said primary winding;

a rectifier coupled to a secondary winding of said isolation transformer and having a freewheeling diode that conducts to transfer energy to an output of said power converter;

a secondary active clamp, including:

an inductor, coupled in series with said freewheeling diode, and a series-coupled capacitor and clamping switch, coupled in parallel with said inductor, that cooperate therewith to mitigate adverse effects of a reverse recovery phenomenon associated with said rectifier and to effect substantially zero voltage switching of said power switch; and a controller, coupled to said power and clamping switches, that controls conduction intervals of said power and clamping switches.

16. The power converter as recited in claim 15 wherein said clamping switch conducts to couple said capacitor across said inductor thereby enabling said capacitor to discharge through said inductor.

17. The power converter as recited in claim 15 wherein said clamping switch is a metal oxide semiconductor field-effect transistor (MOSFET).

18. The power converter as recited in claim 17 wherein said freewheeling diode and a body diode of said clamping switch are similarly oriented.

19. The power converter as recited in claim 15 wherein said power converter is selected from the group consisting of:

a flyback converter;

a forward converter; and a half-bridge converter.

20. The power converter as recited in claim 15 wherein said controller monitors an output voltage of said power converter and controls said conduction intervals of said power and clamping switches in response thereto.

* * * * *